US012319070B2

(12) United States Patent
Ishikura

(10) Patent No.: US 12,319,070 B2
(45) Date of Patent: Jun. 3, 2025

(54) PRINTING APPARATUS

(71) Applicant: SEIKO EPSON CORPORATION, Tokyo (JP)

(72) Inventor: Takuro Ishikura, Ueda (JP)

(73) Assignee: SEIKO EPSON CORPORATION, Tokyo (JP)

( * ) Notice: Subject to any disclaimer, the term of this patent is extended or adjusted under 35 U.S.C. 154(b) by 173 days.

(21) Appl. No.: 18/363,792

(22) Filed: Aug. 2, 2023

(65) Prior Publication Data

US 2024/0042778 A1 Feb. 8, 2024

(30) Foreign Application Priority Data

Aug. 2, 2022 (JP) ................................ 2022-123173

(51) Int. Cl.

| | |
|---|---|
| ***B41J 25/304*** | (2006.01) |
| ***B41J 2/01*** | (2006.01) |
| ***B41J 19/00*** | (2006.01) |
| ***H01R 12/77*** | (2011.01) |
| *B41J 2/045* | (2006.01) |
| *B41J 2/175* | (2006.01) |
| *H01R 13/631* | (2006.01) |

(52) U.S. Cl.

CPC ............... *B41J 25/304* (2013.01); *B41J 2/01* (2013.01); *B41J 19/005* (2013.01); *H01R 12/771* (2013.01); *B41J 2/04548* (2013.01); *B41J 2/175* (2013.01); *B41J 2/17509* (2013.01); *H01R 13/631* (2013.01)

(58) Field of Classification Search

CPC . B41J 25/304; B41J 2/01; B41J 19/005; B41J 2/04548; B41J 2/175; B41J 2/17509; H01R 12/771; H01R 13/631

See application file for complete search history.

(56) References Cited

U.S. PATENT DOCUMENTS

| | | | | |
|---|---|---|---|---|
| 10,195,878 B2 * | 2/2019 | Wang | B41J 19/005 | |
| 2014/0192114 A1 * | 7/2014 | Ito | B41J 19/005 | 347/37 |
| 2014/0292871 A1 * | 10/2014 | Kondo | B41J 2/17509 | 347/14 |
| 2020/0247154 A1 * | 8/2020 | Sekikawa | B41J 19/005 | |

FOREIGN PATENT DOCUMENTS

JP 2014-063629 A 4/2014

* cited by examiner

*Primary Examiner* — Henok D Legesse
(74) *Attorney, Agent, or Firm* — Dority & Manning, P.A.

(57) ABSTRACT

A printing apparatus includes: a head unit including an insertion port into which a flat cable is to be inserted; and a guiding portion configured to guide the flat cable when the flat cable is inserted into the insertion port. The guiding portion includes at least two guide members opposed to each other. The guide members opposed to each other each include a parallel surface to an insertion direction of the flat cable into the insertion port, and are disposed with the parallel surfaces opposed to each other. The distance between the parallel surfaces of the guide members that are opposed to each other matches a width in a longitudinal direction of the insertion port.

5 Claims, 7 Drawing Sheets

PRINTING APPARATUS

The present application is based on, and claims priority from JP Application Serial Number 2022-123173, filed on Aug. 2, 2022, the disclosure of which is hereby incorporated by reference herein in its entirety.

BACKGROUND

1. Technical Field

The present disclosure relates to a printing apparatus.

2. Related Art

Typically, various types of devices that use a flat cable to input an electrical signal are used. For example, JP-A-2014-63629 discloses a configuration including a wall-shaped portion used to restrict a position in the longitudinal direction of the flat cable within a housing. The wall-shaped portion is formed in a tapered shape in which the insertion front side is wide and the width reduces toward the insertion depth side.

The configuration described in JP-A-2014-63629 makes it easy to insert the flat cable. However, the flat cable is not guided from both sides in the longitudinal direction as the flat cable is inserted. This leads to a possibility that the flat cable is obliquely inserted into the insertion portion or a possibility that the flat cable is inserted into the insertion portion at a position shifted in the longitudinal direction or the like.

SUMMARY

A printing apparatus according to the present disclosure to solve the problem described above includes a head unit including an insertion port into which a flat cable is to be inserted, and a guiding portion configured to guide the flat cable when the flat cable is inserted into the insertion port, in which the guiding portion includes at least two guide members opposed to each other, the guide members opposed to each other each include a parallel surface to an insertion direction of the flat cable into the insertion port, and are disposed with the parallel surfaces opposed to each other, and a distance between the parallel surfaces of the guide members opposed to each other matches a width in a longitudinal direction of the insertion port.

DESCRIPTION OF EMBODIMENTS

Figure 1:
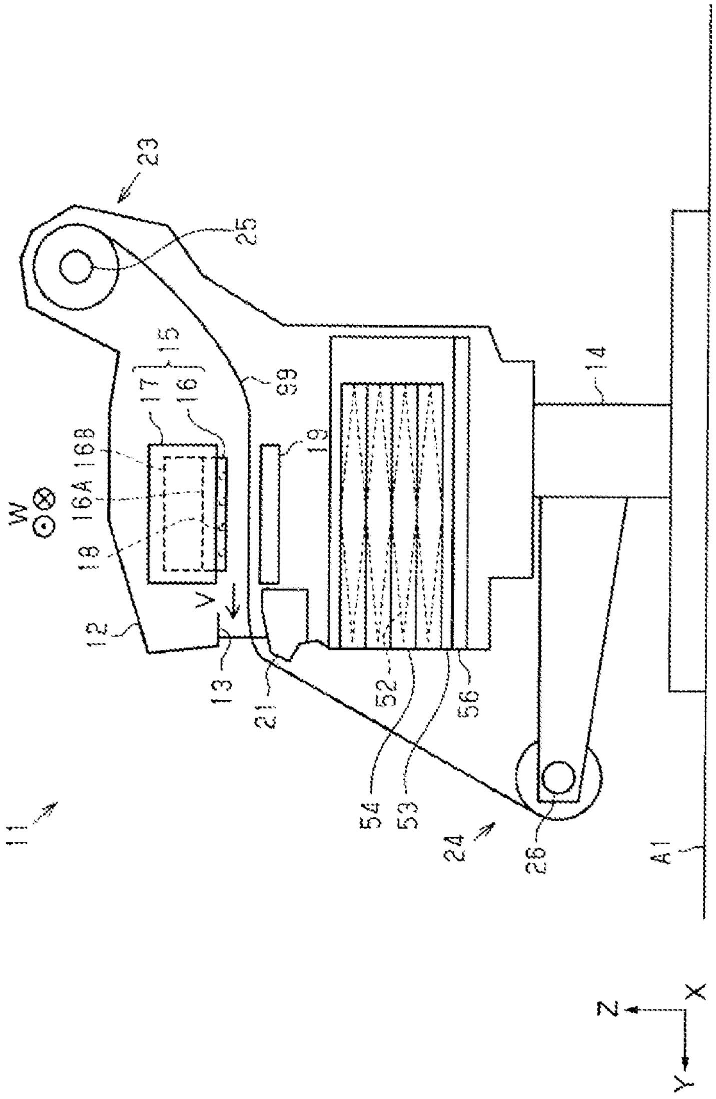
FIG. 1 is a cross-sectional view illustrating a configuration of a printer serving as a printing apparatus according to an embodiment of the present disclosure.

Hereinafter, the present disclosure will be schematically described.

A printing apparatus according to a first aspect of the present disclosure includes: a head unit including an insertion port into which a flat cable is to be inserted, and a guiding portion configured to guide the flat cable when the flat cable is inserted into the insertion port, in which the guiding portion includes at least two guide members opposed to each other, the guide members opposed to each other each include a parallel surface to an insertion direction of the flat cable into the insertion port, and are disposed with the parallel surfaces opposed to each other, and a distance between the parallel surfaces of the guide members that are opposed to each other matches a width in a longitudinal direction of the insertion port.

With the present aspect, the guide members opposed to each other are disposed such that the surfaces parallel to the insertion direction of the flat cable into the insertion port are opposed to each other, and the distance between the parallel surfaces of the guide members that are opposed to each other matches the width in the longitudinal direction of the insertion port. That is, in the present aspect, the flat cable can be inserted into the insertion port while being guided from both sides in the longitudinal direction using the guide members opposed to each other. Thus, it is possible to reduce a possibility that the flat cable is obliquely inserted into the insertion port or a possibility that the flat cable is inserted into the insertion port at a position shifted in the longitudinal direction or the like. This makes it possible to easily insert the flat cable into the insertion port so as to be appropriately positioned.

In addition, a second aspect according to the present disclosure is the printing apparatus according to the first aspect described above, in which the head unit includes a plurality of the insertion ports, and at least two of the plurality of insertion ports are disposed overlapping each other in a direction that intersects the insertion direction and that is parallel to the parallel surfaces.

With the present aspect, at least two of the plurality of insertion ports are disposed overlapping each other in a direction that intersects the insertion direction and that is parallel to the parallel surfaces. That is, the flat cable is divided into a plurality of pieces so that each flat cable does not have an excessively long length in the longitudinal direction. This makes it possible to suppress increase in size of the insertion port and increase in size of the apparatus due to an excessive length in the longitudinal direction of the flat cable.

In addition, a third aspect according to the present disclosure is the printing apparatus according to the second aspect described above, in which the plurality of insertion ports disposed overlapping each other have matching widths in a longitudinal direction.

With the present aspect, the plurality of insertion ports disposed overlapping each other have matching widths in the longitudinal direction. That is, the widths of the plurality of flat cables in the longitudinal direction of the plurality of insertion ports match each other. Thus, in the configuration in which the plurality of flat cables are each inserted into a corresponding insertion port in an overlapping arrangement, it is possible to collectively insert the plurality of flat cables into the insertion ports while guiding them from both sides in the longitudinal direction.

In addition, a fourth aspect according to the present disclosure is the printing apparatus according to any one of the first to third aspects described above, in which the guide members also serve as a positioning member for the head unit.

With the present aspect, the guide members also serve as a positioning member for the head unit. This makes it possible to eliminate the need for providing a separate positioning member for the head unit, which makes it possible to suppress an increase in size of the apparatus.

In addition, a fifth aspect according to the present disclosure is the printing apparatus according to the fourth aspect described above, in which the head unit includes a discharging unit configured to discharge ink, and an ink supplying unit configured to supply the ink to the discharging unit, and the guide members are configured to fix the ink supplying unit.

With the present aspect, the guide members are configured to fix the ink supplying unit. Thus, it is possible to perform positioning and fixing of the head unit including the discharging unit and the ink supplying unit without providing a separate fixing member used to fix the head unit.

Hereinafter, the present disclosure will be specifically described.

Description will be made with reference to the drawings in which three axes perpendicular to each other are set as the X-axis, the Y-axis, and the Z-axis. The direction along the X-axis is set as the "X direction". The direction along the Y-axis is set as the "Y direction". The direction along the Z-axis is set as the "Z direction". The direction indicated by the arrow is set as the +direction, and the direction opposite from the +direction is set as the −direction. Note that the +Z direction is also referred to as "up" or "upward", and the −Z direction is also referred to as "down" or "downward". In addition, the view from the +Z direction is also referred to as "plan view" or "plan view manner". Furthermore, description will be made on the assumption that the surface on the +side in the Z direction is an upper surface and the surface on the −side in the Z direction that is opposite side from the +side is a lower surface.

Figure 2:
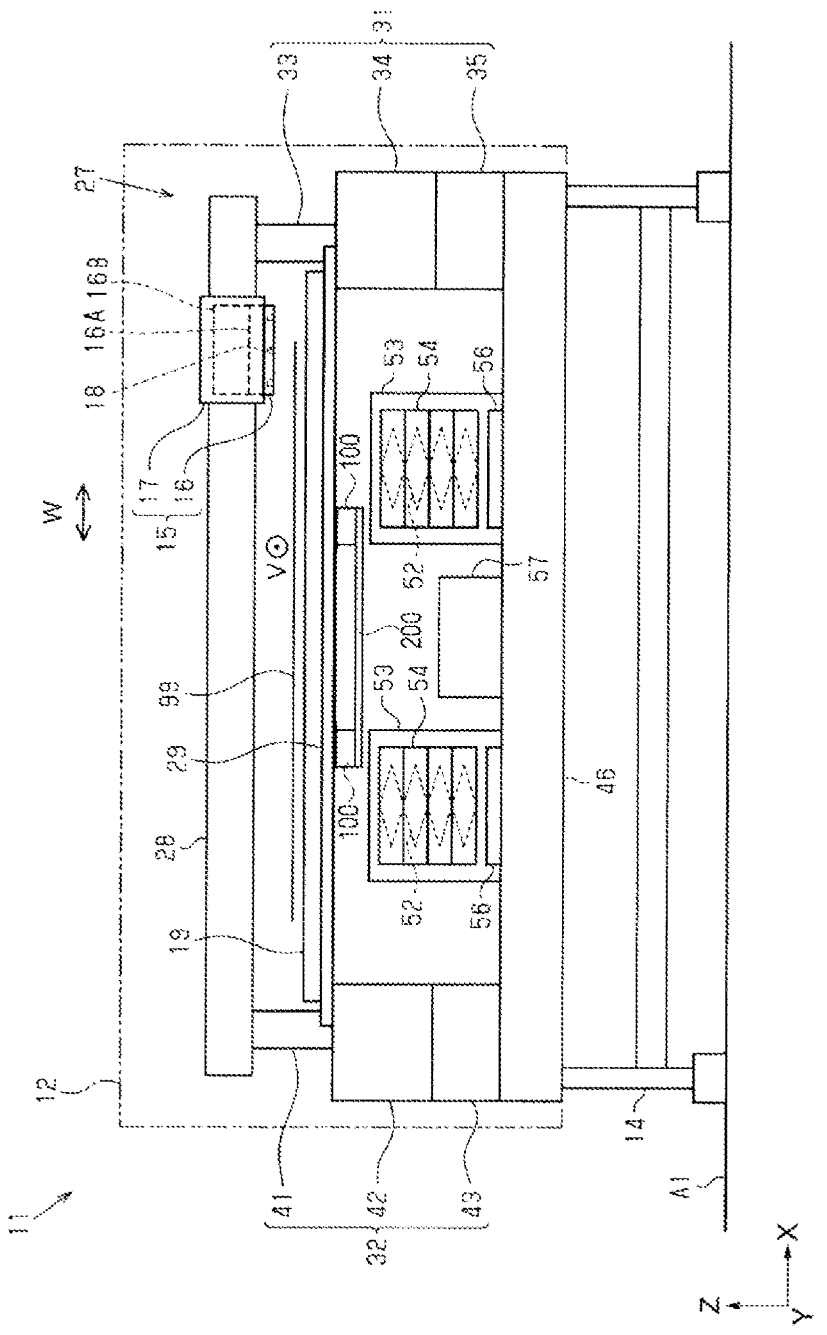
FIG. 2 is a front view illustrating the configuration of the printer in FIG. 1.

First, the configuration of a printer 11 serving as a printing apparatus will be described with reference to FIGS. 1 and 2. For example, the printer 11 discharges ink as a liquid to a sheet 99 serving as a medium to form an image such as a character or a photo, as illustrated in FIGS. 1 and 2.

The printer 11 includes a housing 12, a leg portion 14, a printing unit 15, a platen 19, a first medium holding unit 23, and a second medium holding unit 24. The housing 12 includes a discharge port 13 used to discharge the sheet 99 on which an image has been formed, that is, on which printing has been performed. The housing 12 is supported by the leg portion 14. The leg portion 14 is detachable in the printer 11. The leg portion 14 is in contact with an installation surface A1 where the printer 11 is installed.

The printing unit 15 is accommodated in the housing 12. The printing unit 15 discharges ink to the sheet 99. As the printing unit 15 discharges ink to the sheet 99, an image is printed on the sheet 99. The printing unit 15 includes a head 16, and a carriage 17 carrying the head 16. The head 16 includes a discharging unit 16A including a plurality of nozzles 18 configured to discharge ink, and an ink supplying unit 16B configured to supply ink to the discharging unit 16A. The ink supplying unit 16B according to the present example is a member with which ink is supplied from a liquid accommodation unit 52 to be described later to the head 16 through a tube (not illustrated), and is also a member configured to generate a negative pressure to form meniscus of the ink at the nozzles 18 of the discharging unit 16A. The carriage 17 scans the sheet 99. Specifically, the carriage 17 moves, within the housing 12, in the width direction W, that is, in the +X direction and the −X direction. With this configuration, the head 16 discharges ink throughout the width of the sheet 99.

The printer 11 according to the present embodiment is a serial printer. Note that the printer 11 may be a line printer configured to simultaneously discharge ink throughout the width of the sheet 99. In addition, the disclosure is not limited to the configuration of inkjet printers that discharge ink to the sheet 99 to perform printing as with the printer 11 according to the present example, and may be, for example, a thermal transfer printing apparatus that uses a toner as a printing material to perform printing. The platen 19 is accommodated in the housing 12, and is disposed opposed to the printing unit 15. The platen 19 supports, from below, the sheet 99 transferred in the transport direction V. The printing unit 15 discharges ink to a portion of the platen 19 that is supported. A discharge support portion 21 configured to support the sheet 99 after printing is performed by the printing unit 15 is disposed in the transport direction V of the platen 19.

The first medium holding unit 23 holds the sheet 99 wound around into a roll form before printing is performed by the printing unit 15. The first medium holding unit 23 includes a feeding shaft 25 around which the sheet 99 is wound. The first medium holding unit 23 is accommodated in the housing 12.

The second medium holding unit 24 holds the sheet 99, on which printing has been performed by the printing unit 15, in a state of being wound around in a roll form. The second medium holding unit 24 includes a winding shaft 26 around which the sheet 99 is wound. As the winding shaft 26 rotates, the sheet 99 is wound. For example, the second medium holding unit 24 is attached to the leg portion 14.

As illustrated in FIG. 2, the printer 11 includes a main body frame 27 to which the housing 12 and the leg portion 14 are attached. The main body frame 27 includes a main frame 28, a base frame 29, a first side frame 31, and a second side frame 32. In addition, the main body frame 27 is attached to the coupling frame 46.

The main frame 28 is a frame supporting the carriage 17 of the printing unit 15. The main frame 28 is elongated in the X direction. The base frame 29 is a frame supporting the platen 19. The base frame 29 is elongated in the X direction. The first side frame 31 and the second side frame 32 support the main frame 28 and the base frame 29, and are disposed with the platen 19 interposed therebetween in the X direction. The leg portion 14 is attached to the first side frame 31 and the second side frame 32.

The first side frame 31 includes three side frames 33, 34, and 35. The side frame 33 supports the main frame 28 and the base frame 29. The second side frame 32 includes three side frames 41, 42, and 43. The side frame 41 supports the main frame 28 and the base frame 29.

The coupling frame 46 is attached to the side frame 35 and the side frame 43. The side frame 35 and the side frame 43 can be regarded as constituting a portion of the main body frame 27. Thus, the coupling frame 46 on which the side frame 35 and the side frame 43 are mounted can be regarded as holding the main body frame 27. A holding unit 53 and an electronic component 57 are disposed at the coupling frame 46.

The holding unit 53 includes a holding tray 54 holding the liquid accommodation unit 52 that accommodates ink, and also includes a liquid receiving unit 56 that receives the ink. For example, the number of the holding units 53 disposed in the printer 11 is two. The electronic component 57 is disposed between the two holding units 53. In other words, the electronic component 57 is disposed below the platen 19. Furthermore, in addition to the electronic component 57, a pump unit (not illustrated) is disposed. The pump unit is a pump configured to supply a liquid from the liquid accommodation unit 52 toward the printing unit 15. For example, the pump unit reduces a pressure within the liquid accommodation unit 52 to supply ink to the printing unit 15.

For example, a frame 100 fixed to the base frame 29, and a resin plate 200 attached to the frame 100 at two locations are disposed between the platen 19 and the electronic component 57 in the Z direction. The frame 100 is, for example, a cover for a fan (not illustrated). Note that it is sufficient that the resin plate 200 is disposed between the platen 19 and the electronic component 57. For example, the resin plate 200 may be attached to the base frame 29 without the frame 100 interposed therebetween, or the resin plate 200 may be attached to an inside of the housing 12 or to the main body of the printer 11. In addition, instead of the resin plate 200, a flexible sheet member made of a material other than resin may be provided.

Hereinafter, the printing unit 15 that is a main component of the printer 11 according to the present embodiment will be described in detail with reference to FIGS. 3 to 7. The printer 11 according to the present embodiment is a printing apparatus in which print data that is an electrical signal can be inputted into the head 16 using a flat cable 60 to perform printing. In addition, the printing unit 15 includes the head 16 and the carriage 17 as described above. Of the discharging unit 16A of the head 16 illustrated in FIG. 7, a nozzle formation portion 162 where the nozzles 18 are formed is inserted into a hole portion 174 of the carriage 17 illustrated in FIG. 6. Of the discharging unit 16A of the head 16 illustrated in FIG. 7, a base portion 163 is mounted at a plate-shaped portion 175 of the carriage 17 in FIG. 6. With this configuration, the discharging unit 16A is supported by the carriage 17.

Figure 3:
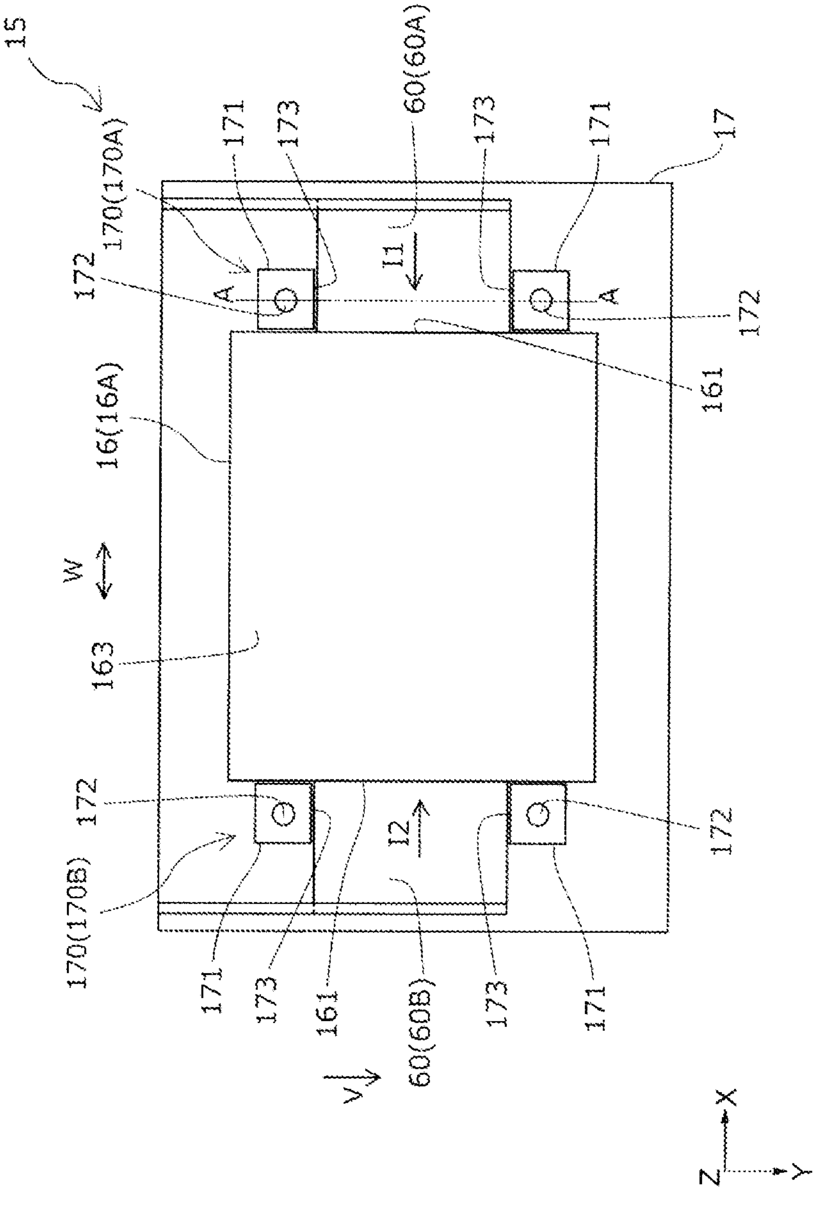
FIG. 3 is a plan view illustrating a printing unit of the printer in FIG. 1 in a state in which an ink supplying unit is removed.
Figure 4:
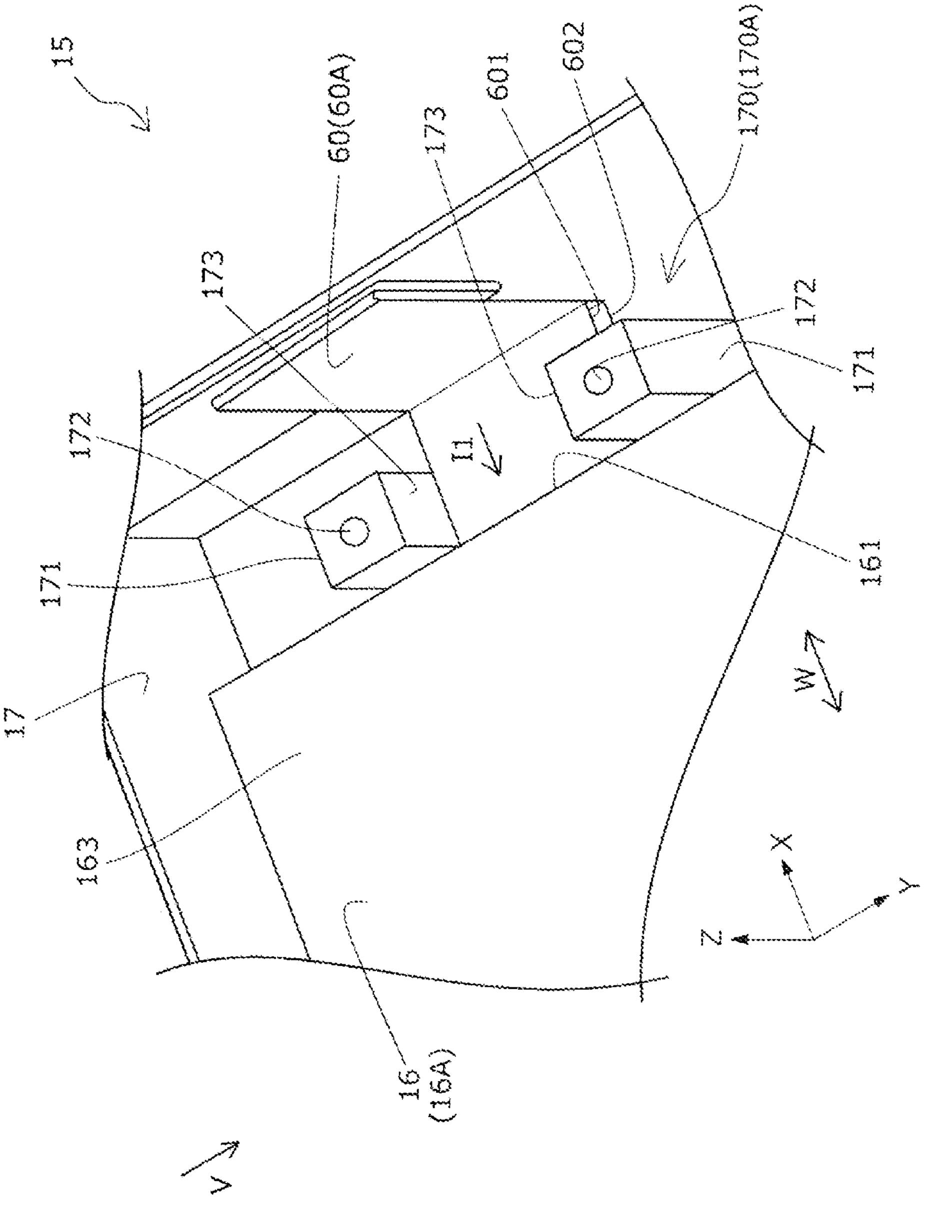
FIG. 4 is a perspective view of the printing unit in FIG. 3.
Figure 5:
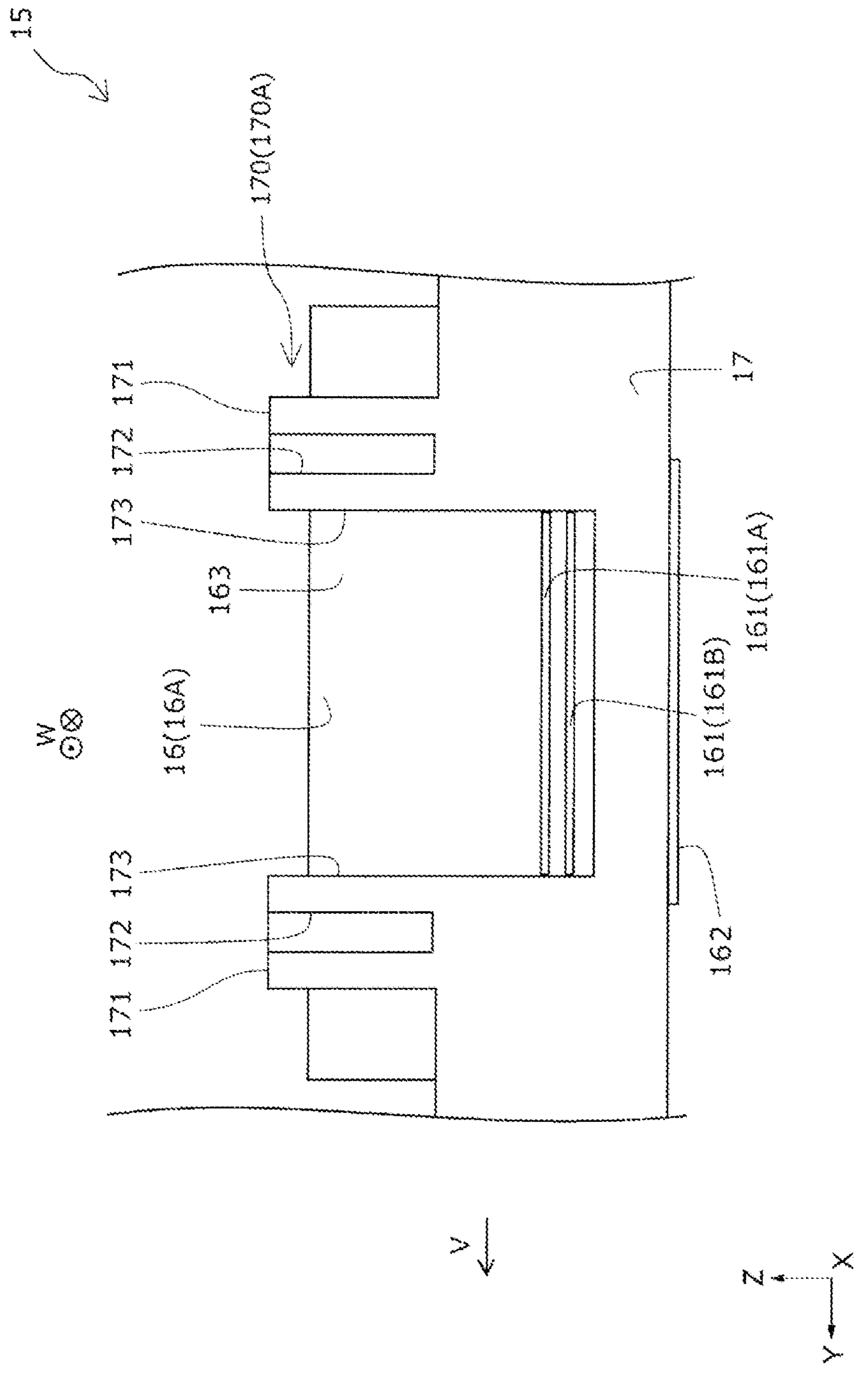
FIG. 5 is a side cross-sectional view of the printing unit in FIG. 3 as viewed from the portion A-A in a state in which a flat cable is removed.
Figure 6:
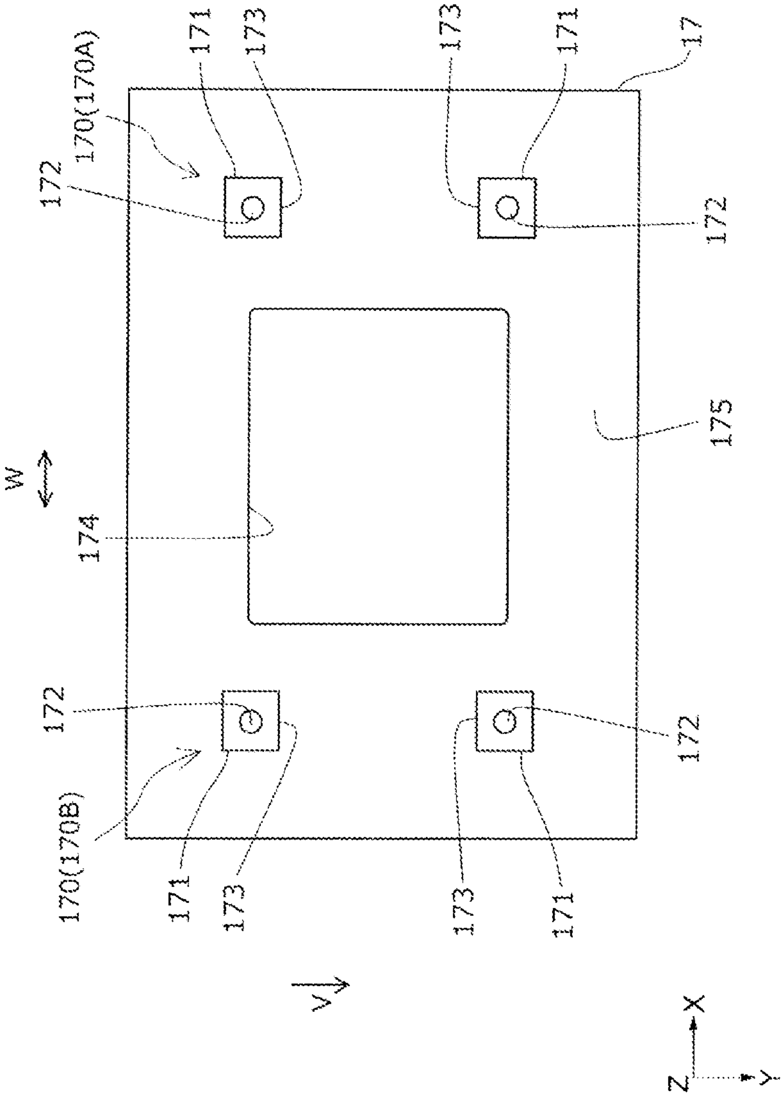
FIG. 6 is a plan view illustrating a carriage of the printing unit in FIG. 3.
Figure 7:
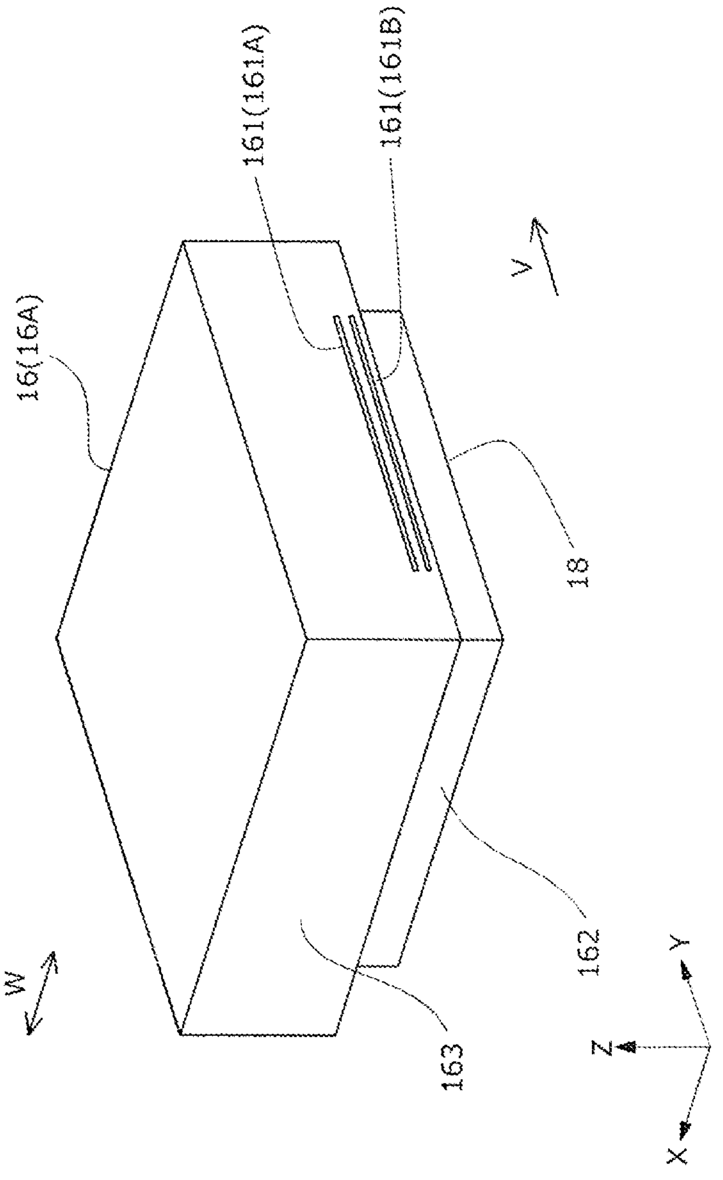
FIG. 7 is a perspective view illustrating a head of the printing unit in FIG. 3.

As illustrated in FIGS. 3 to 6, the printing unit 15 includes the head 16 that is a head unit including a connector, the connector serving as an insertion port 161 into which the flat cable 60 is inserted, and also includes a guiding portion 170 configured to guide the flat cable 60 when the flat cable 60 is inserted into the insertion port 161. Note that, as illustrated in FIG. 3, a flat cable 60A and a flat cable 60B are provided as the flat cable 60. The flat cable 60A is inserted into a corresponding insertion port 161 in an insertion direction I1. The flat cable 60B is inserted into a corresponding insertion port 161 in an insertion direction I2. More specifically, a tip end of each of the flat cable 60A and the flat cable 60B bifurcates into a first portion 601 and a second portion 602 as illustrated in FIG. 4. The head 16 includes a first insertion port 161A serving as the insertion port 161 for the first portion 601, and a second insertion port 161B serving as the insertion port 161 for the second portion 602, as illustrated in FIGS. 5 and 7. The first insertion port 161A and the second insertion port 161B are provided on both sides of the head 16 in the X direction so as to correspond to both the flat cable 60A and the flat cable 60B.

Here, as illustrated in FIG. 3 or the like, the guiding portion 170 includes a guiding portion 170A and a guiding portion 170B provided at two locations corresponding to the flat cable 60A and the flat cable 60B. Each of the guiding portion 170A and the guiding portion 170B includes at least two guide members 171 opposed to each other in the Y direction. In addition, the guide members 171 opposed to each other in the Y direction are disposed such that surfaces 173 parallel to the insertion directions I1 and I2 of the flat cable 60 into the insertion port 161 are opposed to each other. In addition, as illustrated in FIGS. 3 to 5, the distance between the parallel surfaces 173 of the guide members 171 that are opposed to each other in the Y direction matches the width of the flat cable 60, that is, the width of the insertion port 161 in the longitudinal direction. Note that the wording "match" as used herein means that it is sufficient that the width of the flat cable 60 and the width of the insertion port 161 in the longitudinal direction are substantially equal with a tolerance.

As the printing unit 15 of the printer 11 according to the present embodiment has the configuration as described above, it is possible to insert the flat cable 60 into the insertion port 161 while the flat cable 60 is being guided, with the guide members 171 opposed to each other, from both sides in the longitudinal direction (the Y direction corresponding to the width direction of the flat cable 60 in the drawing) of the insertion port 161. Thus, the printer 11 according to the present embodiment makes it possible to reduce a possibility that the flat cable 60 is obliquely inserted into the insertion port 161 or a possibility that the flat cable 60 is inserted into the insertion port 161 at a position shifted in the longitudinal direction of the insertion port 161 or the like. This makes it possible to easily insert the flat cable 60 into the insertion port 161 so as to be appropriately positioned.

In addition, as illustrated in FIGS. 3, 5, 7 or the like, the head 16 according to the present embodiment includes two insertion ports 161 disposed alongside each other in the Z direction at both of the end portion on the +X direction side and the end portion on the −X direction side. That is, the head 16 according to the present embodiment includes four (a plurality of) insertion ports 161. In this manner, in the configuration in which a plurality of the insertion ports 161 are included, at least two of the plurality of insertion ports 161 may be disposed overlapping each other in a direction that intersects the insertion directions I1 and I2 and that is parallel to the parallel surfaces 173, that is, in the Z direction. This is because, by employing such a configuration, the flat cable 60 is divided into a plurality of pieces so that each flat cable 60 does not have an excessively long length in the width direction, and this makes it possible to suppress increase in size of the insertion port 161 and increase in size of the apparatus due to an excessive length in the width direction of the flat cable 60.

In addition, as illustrated in FIGS. 5 and 7, in the printer 11 according to the present embodiment, the first insertion port 161A and the second insertion port 161B, which constitute a plurality of insertion ports 161 disposed overlapping each other in the Z direction, have matching widths in the longitudinal direction. In other words, in the printer 11 according to the present embodiment, the lengths in the width direction of the first portion 601 and the second portion 602 that serve as the plurality of flat cables 60 match each other. Thus, in the configuration of the printer 11 according to the present embodiment in which the plurality of flat cables 60 (the first portion 601 and the second portion 602) are each inserted into the corresponding insertion port 161 of the insertion ports 161 disposed overlapping each other in the Z direction, it is possible to collectively insert the plurality of flat cables 60 into the insertion ports 161 while guiding the cables from both sides in the width direction.

In addition, as described above, in the printer 11 according to the present embodiment, the head 16 includes the discharging unit 16A configured to discharge ink, and the ink supplying unit 16B configured to supply the ink to the discharging unit 16A. Here, the guide member 171 includes a screw hole 172, and is configured such that the ink supplying unit 16B can be screwed to the screw hole 172 to be fixed. With the configuration as described above, it is possible to perform positioning and fixing of the head 16 including the discharging unit 16A and the ink supplying unit 16B and having the configuration of the present embodiment without providing a separate fixing member used to fix the head unit.

In other words, the guide member 171 according to the present embodiment also serves as the positioning member for the head 16. Thus, the printer 11 according to the present embodiment can eliminate the need for providing a separate positioning member for the head unit, which suppresses increase in size of the apparatus.

The present disclosure is not limited to the embodiment described above. It is possible to achieve the present disclosure using various configurations without departing from the main point thereof. For example, in order to solve the problem described above in whole or in part, or in order to achieve the effects described above in whole or in part, the technical characteristics in the embodiment that correspond to the technical characteristics in each mode described in the outline of the disclosure can be replaced or combined as necessary. In addition, technical characteristics can be deleted as necessary unless the technical characteristics are described in the present description as being essential.

As an example of the configuration other than the embodiment according to the present disclosure described above, for example, the distance between the parallel surfaces 173 of the guide members 171 that are opposed to each other may be formed narrower than the width (width in the longitudinal direction of the insertion port 161) of the flat cable 60, and a groove extending in the insertion directions I1 and I2 may be formed in the surfaces 173. When the distance between the grooves of the guide members 171 opposed to each other corresponds to the width of the flat cable 60, it is possible to insert the flat cable 60 into the insertion port 161 while guiding the flat cable 60 from both sides in the Y direction, and it is also possible to guide the flat cable 60 while restricting the position of the flat cable 60 in the Z direction by the grooves.

Furthermore, in the embodiment described above, the flat cable 60 is inserted into the insertion port 161 in a state where the head 16 is mounted at the carriage 17. However, the flat cable 60 may be inserted into the head 16 before the head 16 is mounted at the carriage 17. When the head 16 is mounted at the carriage 17 after the flat cable 60 is inserted into the insertion port 161, the guide members 171 can be utilized to check if the flat cable 60 is correctly inserted into the insertion port 161. For example, in a case in which the flat cable 60 is not correctly inserted into the insertion port 161 and is obliquely inserted in a direction intersecting the insertion directions I1 and I2, the guide members 171 and the flat cable 60 interfere with each other when the head 16 with the flat cable 60 inserted thereinto is mounted at the carriage 17. That is, it is possible to detect whether the flat cable 60 is correctly inserted into the insertion port 161 through the guide members 171.

What is claimed is:

1. A printing apparatus comprising:

a head unit including an insertion port into which a flat cable is to be inserted; and a guiding portion configured to guide the flat cable when the flat cable is inserted into the insertion port, wherein the guiding portion includes at least two guide members opposed to each other, the guide members opposed to each other each include a parallel surface to an insertion direction of the flat cable into the insertion port, and are disposed with the parallel surfaces opposed to each other, and a distance between the parallel surfaces of the guide members opposed to each other matches a width in a longitudinal direction of the insertion port.

2. The printing apparatus according to claim 1, wherein the head unit includes a plurality of the insertion ports and at least two of the plurality of insertion ports are disposed overlapping each other in a direction that intersects the insertion direction and that is parallel to the parallel surfaces.

3. The printing apparatus according to claim 2, wherein the plurality of insertion ports disposed overlapping each other have matching widths in a longitudinal direction.

4. The printing apparatus according to claim 1, wherein the guide members also serve as a positioning member for the head unit.

5. The printing apparatus according to claim 4, wherein the head unit includes:

a discharging unit configured to discharge ink and an ink supplying unit configured to supply the ink to the discharging unit and the guide members are configured to fix the ink supplying unit.

* * * * *